US008986568B2

(12) United States Patent
Morita et al.

(10) Patent No.: US 8,986,568 B2
(45) Date of Patent: Mar. 24, 2015

(54) SINTERED MAGNET AND METHOD FOR PRODUCING THE SINTERED MAGNET

(75) Inventors: Hiroyuki Morita, Tokyo (JP); Yoshihiko Minachi, Tokyo (JP); Takahiro Mori, Tokyo (JP); Tatsuya Kato, Tokyo (JP); Nobuhiro Suto, Tokyo (JP); Naoto Oji, Tokyo (JP)

(73) Assignee: TDK Corporation, Tokyo (JP)

( * ) Notice: Subject to any disclaimer, the term of this patent is extended or adjusted under 35 U.S.C. 154(b) by 88 days.

(21) Appl. No.: 13/637,559

(22) PCT Filed: Mar. 31, 2011

(86) PCT No.: PCT/JP2011/058330
§ 371 (c)(1), (2), (4) Date: Sep. 26, 2012

(87) PCT Pub. No.: WO2011/125900
PCT Pub. Date: Oct. 13, 2011

(65) Prior Publication Data

US 2013/0027160 A1 Jan. 31, 2013

(30) Foreign Application Priority Data

Mar. 31, 2010 (JP) ................................ 2010-082526

(51) Int. Cl.

| | |
|---|---|
| ***C04B 35/26*** | (2006.01) |
| ***C04B 35/64*** | (2006.01) |
| ***C22C 33/02*** | (2006.01) |
| ***B22F 3/22*** | (2006.01) |
| ***H01F 1/11*** | (2006.01) |
| ***H01F 7/02*** | (2006.01) |
| ***H01F 41/02*** | (2006.01) |

(52) U.S. Cl.
CPC ............ *C22C 33/0278* (2013.01); *B22F 3/225* (2013.01); *B22F 2998/10* (2013.01); *H01F 1/11* (2013.01); *H01F 7/021* (2013.01); *H01F 41/0266* (2013.01)
USPC ...................................................... 252/62.56

(58) Field of Classification Search
CPC ..... H01F 1/0556; H01F 1/059; H01F 1/0577; H01F 1/0266; H01F 1/344; H01F 1/08; H01F 1/11; H01F 1/22; H01F 41/0266; H01F 41/0246; H01F 7/02; H01F 7/021; B22F 9/04; B22F 3/10; B22F 2003/248; G11B 5/70678; C22C 33/0278
USPC .................. 252/62.56, 62.51 R, 62.54, 62.55
See application file for complete search history.

(56) References Cited

U.S. PATENT DOCUMENTS 7,481,698 B2 1/2009 Yamada et al.
(Continued)

FOREIGN PATENT DOCUMENTS

CN 1421880 6/2003
CN 101036202 9/2014
(Continued)

OTHER PUBLICATIONS

Translation of JP 03130921 A, received Sep. 17, 2014.*
(Continued)

*Primary Examiner* — Carol M Koslow
*Assistant Examiner* — Lynne Edmondson
(74) *Attorney, Agent, or Firm* — Oliff PLC

(57) ABSTRACT

The present invention aims to ensure strength of a thin-walled sintered magnet. A sintered magnet is a ferrite sintered magnet made by sintering a magnetic material. A magnetic powder mixture obtained by mixing magnetic powder with a binder resin is injection-molded into a mold with a magnetic field applied thereto to produce a molded body, which is then sintered to produce the sintered magnet. The sintered magnet has a thickness of 3.5 mm or less in the position of center of gravity thereof. The sintered magnet has a surface roughness Rz of 0.1 μm or more and 2.5 μm or less. The surface roughness Rz is a 10 point average roughness.

2 Claims, 7 Drawing Sheets

(56) References Cited

U.S. PATENT DOCUMENTS

| | | | | |
|---|---|---|---|---|
| 7,563,522 | B2 * | 7/2009 | Yajima et al. | 428/839.6 |
| 7,740,716 | B2 | 6/2010 | Enokido et al. | |
| 2003/0097905 | A1 | 5/2003 | Yamada et al. | |
| 2006/0293167 | A1 * | 12/2006 | Hitomi et al. | 501/127 |
| 2008/0224937 | A1 * | 9/2008 | Kimura et al. | 343/787 |

FOREIGN PATENT DOCUMENTS

| | | |
|---|---|---|
| JP | 03130921 A * | 6/1991 |
| JP | A-2002-212602 | 7/2002 |
| JP | A-2002-353021 | 12/2002 |
| JP | A-2005150572 | 6/2005 |
| KR | 1020050006974 A | 1/2005 |

OTHER PUBLICATIONS http://www.thefreedictionary.com/permanent+magnet, p. 1, printed Sep. 17, 2014.*

International Search Report issued in International Patent Application No. PCT/JP2011/058330 mailed Jun. 21, 2011.

Search Report dated Feb. 7, 2014 issued in European Patent Application No. 11765800.5.

* cited by examiner

SINTERED MAGNET AND METHOD FOR PRODUCING THE SINTERED MAGNET

FIELD

The present invention relates to ensuring strength of a thin-walled sintered magnet and a method for producing the thin-walled sintered magnet.

BACKGROUND

Sintered magnets are widely used for motors and the like mounted in household electric appliances, automobiles, and the like. In recent years, smaller and thinner-walled sintered magnets are sought after for requirements for space saving, fuel economy improvement, and the like. In order to improve strength of a ferrite sintered magnet, for example, Japanese Patent Application Laid-Open No. 2002-353021 discloses a technique described below. In this technique, powder to be molded is substantially composed of magnetic powder obtained by powderizing a ferrite sintered magnet containing Fe, an element A, an element R and an element M, or substantially composed of the magnetic powder and raw material powder containing Fe, the element A, the element R and the element M.

CITATION LIST

Patent Literature

Patent Literature 1: Japanese Patent Application Laid-Open No. 2002-353021 (Paragraph 0006)

SUMMARY

Technical Problem

In order to produce a thin-walled sintered magnet, the sintered magnet needs to be thinned by being subjected to processing such as grinding a sintered body having a certain degree of thickness. However, processing for thinning the sintered magnet could reduce mechanical strength of the sintered magnet, and also the processing itself is difficult. In particular, reducing the thickness of the sintered magnet to less than 4 mm significantly reduces the mechanical strength of the sintered magnet.

The technique disclosed in Japanese Patent Application Laid-Open No. 2002-353021 improves the strength of the sintered magnet by devising the composition of raw material. However, when the thickness of the sintered magnet is reduced to less than 4 mm by the thinning of the sintered magnet, there is a limitation in ensuring the strength of the sintered magnet by a technique such as disclosed in Japanese Patent Application Laid-Open No. 2002-353021. Thus, when trying to reduce the wall thickness of a sintered magnet to obtain a sintered magnet having a thickness of less than 4 mm, it is extremely difficult to ensure the strength of the sintered magnet. In view of the above description, it is an object of the present invention to ensure the strength of a thin-walled sintered magnet.

Solution to Problem

A sintered magnet having a thickness of 4 mm or more can be ensured to have a necessary strength by the thickness of the sintered magnet itself. A thin-walled sintered magnet having a thickness of less than 4 mm cannot utilize the thickness of the sintered magnet itself, and thus cannot be ensured to have a sufficient strength. In order to ensure the strength of a sintered magnet that is thinned to a degree as to be incapable of utilizing the thickness of the sintered magnet, the inventor of the present invention has focused attention on a surface roughness Rz that had not received attention in a sintered magnet ensured to have a certain degree of thickness. As a result of conducting devoted research in this respect, the inventor has found that the surface roughness Rz is highly correlated with the strength of the sintered magnet. This correlation is particularly higher as the wall thickness of the sintered magnet is smaller. The present invention has been completed based on such findings.

According to an aspect of the present invention, there is provided a sintered magnet made by sintering a magnetic material, the sintered magnet having a thickness of 3.5 mm or less in the position of center of gravity thereof and a surface roughness Rz of 2.5 μm or less.

The strength of the sintered magnet is higher as the surface roughness Rz of the sintered magnet is smaller. Furthermore, even a sintered magnet thinned to have a thickness of 3.5 mm or less can be ensured to have a practically sufficient strength when the surface roughness Rz is 2.5 μm or less.

As a preferable aspect of the present invention, the surface roughness Rz is preferably 0.1 μm or more. Setting the lower limit value of the surface roughness Rz of the sintered magnet to 0.1 μm eliminates the need for reducing the surface roughness Rz of the sintered magnet more than necessary, and thus can suppress productivity of the sintered magnet from dropping.

As a preferable aspect of the present invention, the sintered magnet is preferably a ferrite sintered magnet. The ferrite sintered magnet is a type of ceramic ware, and thus is likely to generate cracks and chips, thereby being significantly reduced in strength by being thinned. According to the present invention, the surface roughness Rz is set to 2.5 μm or less, and thereby, even a thin-walled ferrite sintered magnet can be ensured to have a sufficient strength.

According to one aspect of the present invention, there is provided a method for producing a sintered magnet characterized by including the steps of: mixing magnetic powder with at least a binder resin to obtain a magnetic powder mixture; injection molding the magnetic powder mixture inside of a mold having a surface roughness Rz of a surface in contact with the magnetic powder mixture of 3.0 μm or less with a magnetic field applied to the mold, to obtain a molded body; and sintering the molded body.

In the method for producing a sintered magnet, a mold in which the surface roughness Rz in a part in contact with a magnetic powder mixture is 3.0 μm or less is used and the magnetic powder mixture is injection molded inside of the mold to obtain a molded body. The obtained molded body is then sintered to produce a sintered magnet. The molded body obtained using such a mold is sintered to easily produce a sintered magnet having a surface roughness Rz of 2.5 μm or less.

Advantageous Effects of Invention

The present invention can ensure strength of a thin-walled sintered magnet.

BRIEF DESCRIPTION OF DRAWINGS

FIG. 1-2 is a perspective view illustrating another example of the sintered magnet according to the present embodiment.

FIG. 1-3 is a perspective view illustrating still another example of the sintered magnet according to the present embodiment.

FIG. 2 is a diagram illustrating a relationship between strength and thickness of the sintered magnet.

FIG. 3 is a flow chart illustrating a procedure of a method for producing a sintered magnet according to the present embodiment.

FIG. 6-1 is an explanatory view illustrating a method for measuring strength.

FIG. 6-2 is an explanatory view of dimensions of a sample.

FIG. 6-3 is an explanatory view of a dimension of the sample.

DESCRIPTION OF EMBODIMENTS

Hereinafter, embodiments of the present invention will be described in detail with reference to the drawings. Note that embodiments of the present invention is not limited to the following description. The components in the following description include those which can be readily envisaged by one skilled in the art, be substantially the same, and falls within the range of equivalent. Constitutions disclosed below can be appropriately combined with each other.

Figure 1:
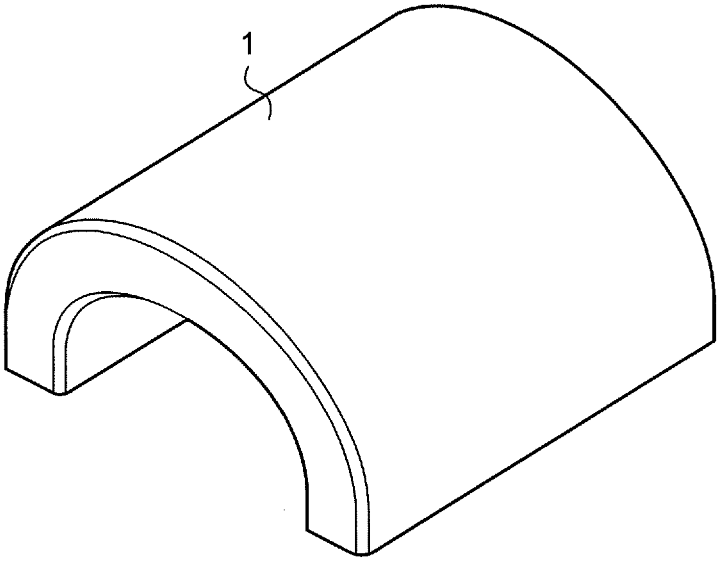
FIG. 1-1 is a perspective view illustrating an example of a sintered magnet according to an embodiment of the present invention.
Figures 1, 2:
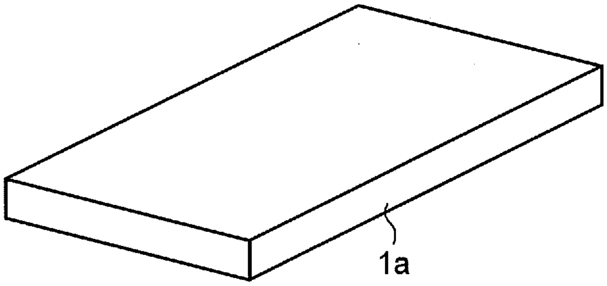
Figures 1, 2, 3:
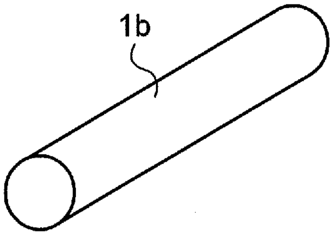
Figure 2:
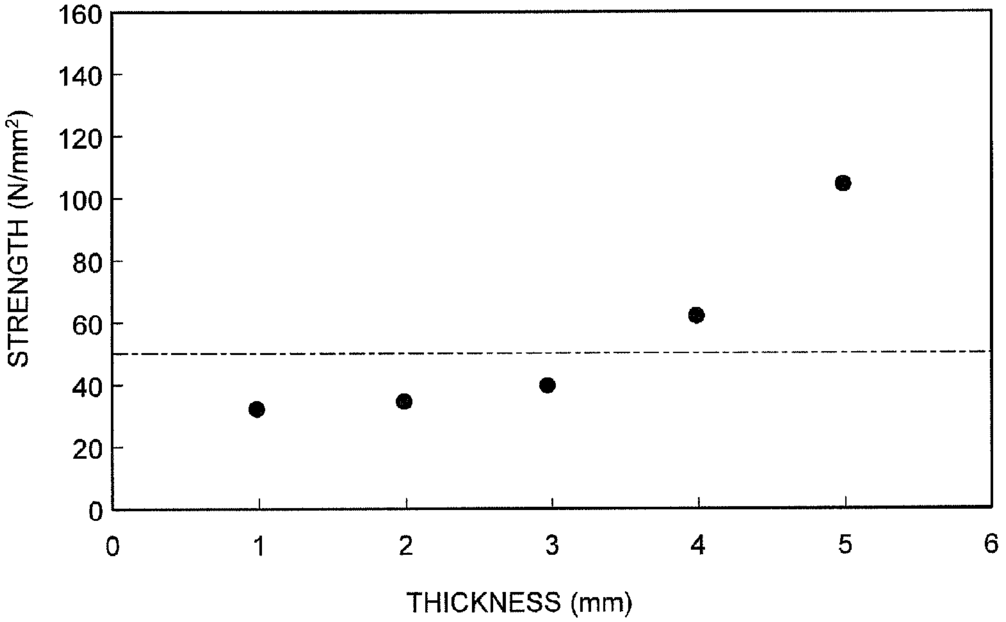
Figure 3:
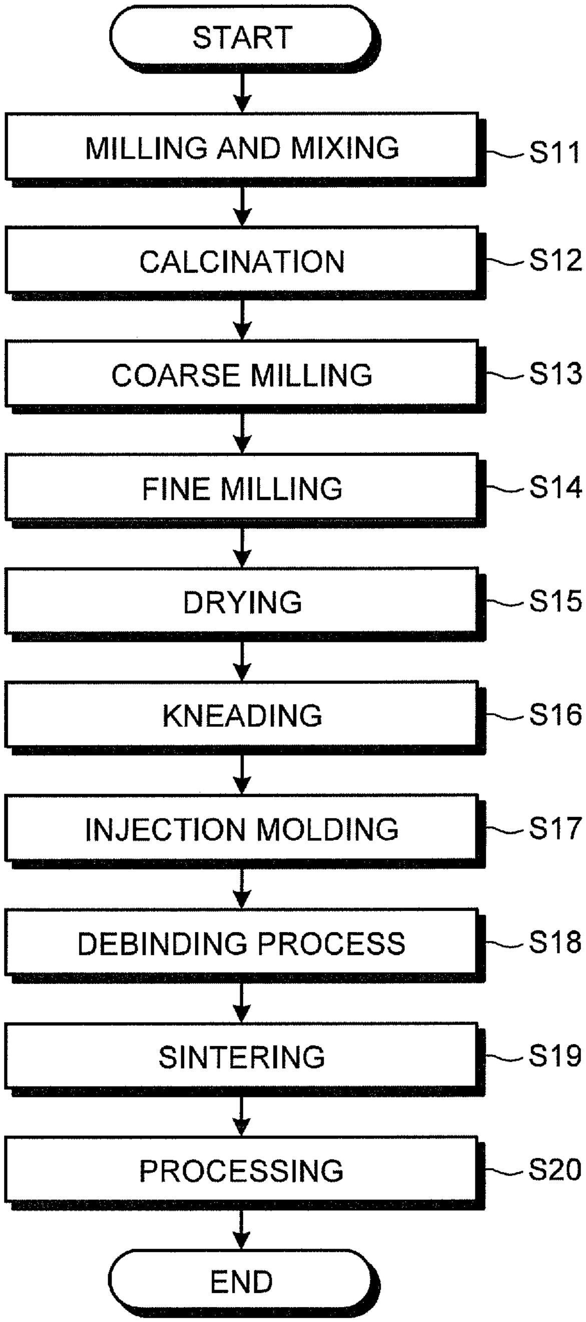

FIGS. 1-1, 1-2, and 1-3 are perspective views illustrating examples of a sintered magnet according to an embodiment of the present invention. The sintered magnet according to the present embodiment can have various shapes. For example, a sintered magnet 1 illustrated in FIG. 1-1 has an overall shape of an arch, a cross section of a circular arc shape, and chamfered corners. A sintered magnet 1*a* illustrated in FIG. 1-2 has an overall shape of a plate and a rectangular shape in plan view. A sintered magnet 1*b* illustrated in FIG. 1-3 has a cylindrical shape. In the present embodiment, the sintered magnet needs not have an entirely constant thickness. In the present embodiment, the sintered magnet is not limited to have these shapes.

In the present embodiment, a surface roughness Rz is a 10 point average roughness. The 10 point average roughness is the sum of the average of the absolute values of the 5 highest peak points (Yp) and the average of the absolute values of the 5 lowest valley points (Yv) which are measured in a longitudinal magnification direction from an average line of only a standard length which is taken from a roughness curve in the direction of the average line, and represents this value in micrometers.

The sintered magnet 1 illustrated in FIG. 1-1 is a permanent magnet, for example, used in a stator of a motor. An object to which the sintered magnet according to the present embodiment is applied is not limited to a motor, and the sintered magnet is widely applicable to a permanent magnet used in a generator, a speaker, a microphone, a magnetron tube, a magnetic field generating apparatus for MRI, an ABS sensor, a fuel/oil level sensor, a sensor for distributors, a magnet clutch, and the like.

The sintered magnet according to the present embodiment is, for example, a ferrite sintered magnet. The ferrite sintered magnet is widely used because it has relatively high magnetic characteristics and is inexpensive. The type of ferrite sintered magnet is not particularly limited, and can be any type based on, for example, barium, strontium, or calcium. The type of the sintered magnet according to the present embodiment is not limited to the ferrite sintered magnet, but can be a sintered metallic magnet such as a rare-earth sintered magnet or a sintered samarium cobalt magnet. That is, the present embodiment applies to sintered magnets in general.

FIG. 2 is a diagram illustrating a relationship between strength and thickness of the sintered magnet. The relationship illustrated in FIG. 2 was obtained as a result of changing the thickness of an arch-shaped ferrite sintered magnet such as illustrated in FIG. 1-1. All of the ferrite sintered magnets used for obtaining the result of FIG. 2 have a surface roughness Rz of 3.0 μm. In FIG. 2, the strength on the vertical axis represents transverse rupture strength in units of $N/mm^2$. The values of the transverse rupture strength were obtained from bending tests to be hereinafter described. The transverse rupture strength is a type of physical property value indicating strength against bending, and is also called bending strength. When the sintered magnet is only subjected to a bending moment without being subjected to a shear force, a compressive force acts on the inside of a bending arc, and a tensile force acts on the outside of the bending arc, the boundary between the compression and the tension being a plane (that is, a neutral plane) that is neither elongated nor shortened by the bending action. The transverse rupture strength represents a maximum stress acting when the sintered magnet is ruptured by the bending moment (bending load).

As is found from FIG. 2, the strength of the ferrite sintered magnet decreases as the thickness thereof decreases, and rapidly drops when the thickness decreases to less than 4 mm. When the thickness of the ferrite sintered magnet decreases to 3.5 mm or less, the strength drops to less than a reference value (50 $N/mm^2$ in the present embodiment). Thus, it is found that the strength of the ferrite sintered magnet depends on the thickness thereof, and that a necessary strength cannot be ensured when the thickness has a certain value or less. Although the same tendency as described above is seen in sintered magnets in general, the ferrite sintered magnet in particular has the tendency to a remarkable degree. This is considered because the ferrite sintered magnet is a type of ceramic ware and thus is likely to generate cracks and chips.

In order to solve the problem that reducing the wall thickness of a sintered magnet makes it impossible to ensure sufficient strength, the present embodiment has focused attention on the surface roughness Rz of the sintered magnet. As a result, it has been found that it is effective for ensuring the strength to reduce the surface roughness Rz of the sintered magnet (particularly, the ferrite sintered magnet) to 2.5 μm or less. By limiting the surface roughness Rz to such a range, a sufficient strength can be ensured even when the sintered magnet has a small thickness (of, for example, 3.5 mm or less). The effect for ensuring the strength of sintered magnet is particularly large when the sintered magnet has a small thickness of 3.0 mm or less.

Although the strength of the sintered magnet increases as the surface roughness Rz decreases, the strength of the sintered magnet hardly increases after the surface roughness Rz is reduced to less than 0.1 μm. Accordingly, the lower limit value of the surface roughness Rz is set to 0.1 μm so as to eliminate the need for processing the sintered magnet to an excessive degree to reduce the surface roughness Rz of the sintered magnet. Thus, a production cost of the sintered magnet can be reduced, and the productivity thereof can also be suppressed from dropping.

As described above, the sintered magnet according to the present embodiment can be applied to sintered magnets of various shapes, and need not have a uniform thickness over the entire sintered magnet. Therefore, in the present embodiment, it is necessary to define which portion has a representative thickness for the sintered magnet. In the present embodiment, the thickness in the position of center of gravity of the sintered magnet is treated as the representative thickness for the sintered magnet. If the center of gravity lies in the sintered magnet, the thickness in the position of center of gravity is defined as the dimension of a portion having the smallest distance between two intersecting points obtained when a straight line passing through the center of gravity of the sintered magnet intersects surfaces of the sintered magnet. If the center of gravity does not lie in the sintered magnet, the thickness in the position of center of gravity is defined as follows. For example, if the sintered magnet has a substantially C-shaped cross section, a center axis of a hypothetical circle having the inside diameter or the outside diameter of the C-shape is assumed; an angle is formed by connecting the center axis with ends of an arc having the inside diameter or the outside diameter of the C-shape, and divided in half by a straight line, which is perpendicular to the center axis and passes through the center of gravity of the sintered magnet; then, the thickness in the position of center of gravity is defined as the dimension of a portion where the straight line penetrates the sintered magnet. In the case of a tubular-shaped sintered magnet having a circular, oval, or polygonal cross section, the thickness in the position of center of gravity is defined as the dimension of a portion having the smallest thickness among dimensions of portions where a straight line perpendicular to the center axis of the tubular-shaped sintered magnet and passing through the center of gravity of the sintered magnet penetrates the sintered magnet. If the thickness and the density of the sintered magnet are constant, the center of gravity of the sintered magnet coincides with the centroid of the sintered magnet. Note that, if the thickness and the density of the sintered magnet are constant, the thickness defined in any position has the same value.

The sintered magnet according to the present embodiment has preferably a thickness of 3.5 mm or less in the position of the center of gravity, and more preferably a thickness of 3.0 mm or less in the position of the center of gravity. It is difficult to ensure the strength of such a thin-walled sintered magnet. However, a sufficient strength can be ensured by setting the surface roughness Rz to 2.5 μm or less like the present embodiment. In particular, the strength of the ferrite sintered magnet significantly decreases when the wall thickness is reduced to 3.5 mm or less, and further reduced to 3.0 mm or less. Accordingly, the surface roughness Rz is preferably reduced to 2.5 μm or less so as to be able to ensure a sufficient strength. Next, a method for producing a sintered magnet according to the present embodiment will be described. In the present embodiment, it is important that the sintered magnet having a surface roughness Rz of 2.5 μm or less can be produced. The production method is not limited to the following methods as far as such a sintered magnet can be produced. A case in which the sintered magnet is a ferrite sintered magnet will be described first.

[Example 1 of Method for Producing Sintered Magnet]

FIG. 3 is a flow chart illustrating a procedure of a method for producing a sintered magnet according to the present embodiment. In the method for producing a sintered magnet according to the present embodiment, the ferrite sintered magnet will be described first. Powders of starting materials (raw material powders) are prepared, weighed, and, for example, mixed and milled with a wet attritor (step S11). The raw material powders are not particularly limited. The mixed and milled raw material powders are dried, sized, and calcined (step S12). In the calcination, the raw material powders are calcined, for example, in air at 1000° C. to 1350° C. for about one hour to about ten hours. The raw material powders are calcined to obtain a granular calcined body.

The calcined body obtained is coarsely milled (step S13) to obtain a calcined powder. In the present embodiment, the calcined body is subjected to dry coarse milling, for example, with a vibration mill, but means for milling the calcined body is not limited thereto. For example, a dry attritor (media agitating mill), a dry ball mill, and the like can be used as the means. A coarse milling time can be appropriately determined depending on the milling means. The dry coarse milling also has an effect in which crystalline distortion is introduced into particles of the calcined body to reduce a coercive force HcJ. The reduction of the coercive force HcJ suppresses agglomeration of the particles to improve dispersibility. In addition, the degree of orientation is also improved. The crystalline distortion introduced into the particles is relaxed in a sintering described below, so that original hard magnetism is restored to make a permanent magnet.

After completion of the coarse milling, the resulting calcined powder is finely milled (step S14). When fine milling is performed in the present embodiment, the calcined powder, a dispersant, and water are mixed to prepare a slurry for milling. The slurry for milling is subjected to wet milling with a ball mill. Means for fine milling is not limited to a ball mill, and for example, an attritor, a vibration mill, and the like can be used. A fine milling time can be appropriately determined depending on the milling means. A surfactant (for example, polyhydric alcohol represented by a formula $C_n(OH)_nH_{n+2}$) may be added to the slurry for milling. The number n of carbon atoms in the polyhydric alcohol is 4 or more, preferably 4 to 100, more preferably 4 to 30, yet more preferably 4 to 20, and most preferably 4 to 12.

The slurry for milling after finely milled is dried (step S15) to obtain a magnetic powder. A drying temperature in step S15 is preferably 80° C. to 150° C., and more preferably 100° C. to 120° C. A drying time in step S15 is preferably 60 minutes to 600 minutes, and more preferably 300 minutes to 600 minutes. The obtained magnetic powder is mixed in a binder resin, a wax, a lubricant, and a plasticizer, and the resulting mixture is mixed and kneaded with a kneader under a heating environment (in the present embodiment, at about 150° C.) for a predetermined time (about 2 hours) (step S16) to obtain a kneaded mixture. The magnetic powder needs to be mixed and kneaded with at least a binder resin.

A macromolecular compound such as a thermoplastic resin is used as the binder resin, and examples of the thermoplastic resins used may include polyethylene, polypropylene, an ethylene vinyl acetate copolymer, atactic polypropylene, an acrylic polymer, polystyrene, polyacetal, and the like. Examples of the wax used include, in addition to natural wax such as carnauba wax, montan wax, and bees wax, synthetic wax such as paraffin wax, urethane wax, and polyethylene glycol. Examples of the lubricant used include a fatty acid ester or the like, and a phthalate ester is used as the lubricant.

The kneaded mixture obtained by the above-described procedure is molded with a pelletizer (for example, a twin taper single extruder). Thus, a magnetic powder mixture (hereinafter referred to as pellet) in which the magnetic powder is dispersed in the binder resin is obtained. The obtained pellets are injection molded (step S17) to obtain a magnetic powder molded body. Next, the injection molding apparatus used in injection molding will be described.

Figure 4:
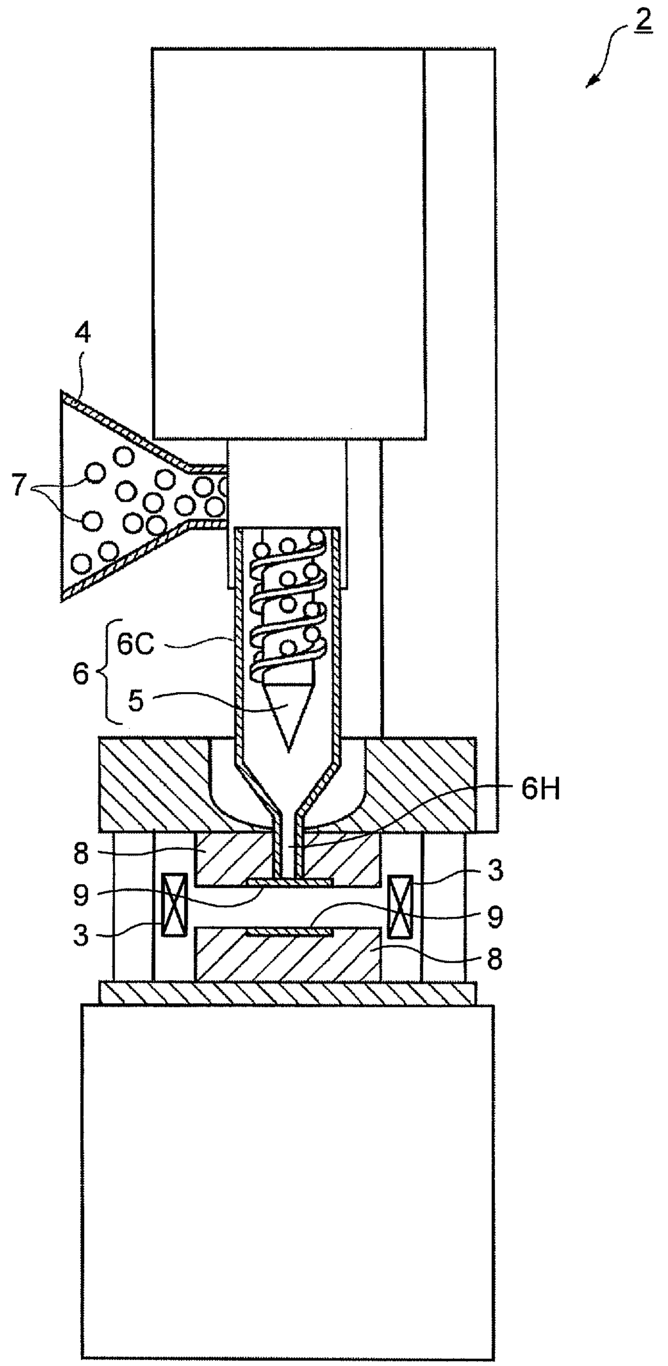
FIG. 4 is a cross-sectional view of an injection molding apparatus used in the method for producing a sintered magnet according to the present embodiment.

FIG. 4 is a cross-sectional view of an injection molding apparatus used in the method for producing a sintered magnet according to the present embodiment. An injection molding apparatus 2 is an injection molding apparatus using CIM (Ceramic Injection Molding), and is used to perform injection molding in a magnetic field formed by a magnetic field application apparatus 3. The injection molding apparatus 2 includes the magnetic field application apparatus 3, an input port 4, a screw 5, an extruder 6, and a mold 8. A magnetic powder pellet (denoted by 7 in FIG. 4) is input into the input port 4. The extruder 6 has a cylindrical casing 6C, and the screw 5 rotatably mounted inside the casing 6C. The input port 4 and the casing 60 are jointed through a path through which the pellets 7 pass. By further inputting the pellets 7 into the input port 4, the existing pellets 7 are further introduced into the inside of the casing 6C. While the pellets 7 introduced into the inside of the casing 6C are heated and molten in the extruder 6, the pellets are transported to an injection port 6H with the use of the screw 5.

The injection port 6H is in communication with a cavity 9 of the mold 8. In the extruder 6, the molten pellets 7 (molten body) are injected into the cavity 9 of the mold 8 through the injection port 6H. The cavity 9 of the mold 8 has a shape to which the outer shape of the ferrite sintered magnet is transferred. The magnetic field application apparatus 3 is disposed around the mold 8, and thus injection molding can be performed with a magnetic field applied to the mold 8. In the injection molding, the mold 8 is closed prior to injection into the mold, and the magnetic field is applied to the mold 8 by the magnetic field application apparatus 3. In the injection molding, the pellets 7 are heated, for example, at about 160° C. to 230° C. and molten inside of the extruder 6, and are injected into the cavity 9 of the mold 8 by the screw 5. The temperature of the mold 8 is, for example, about 20° C. to 80° C. The magnetic field applied to the mold 8 is, for example, about 400 kA/m to 1200 kA/m.

The surface of the cavity 9 is a surface (pellet contact surface) in contact with the molten pellets 7 (magnetic powder mixture). When a sintered magnet is produced by injection molding, the shape of surface of the cavity 9 is transferred to the surface of the molded body. Therefore, the surface roughness Rz of the pellet contact surface of the cavity 9 needs to become the same degree as the surface roughness Rz of the sintered magnet to be produced. In the present embodiment, the surface of the sintered magnet needs to be 2.5 μm or less. The sintered magnet is obtained by sintering the molded body obtained by the injection molding in step S17. The volume of the sintered body is smaller than that of the molded body because of sintering. In consideration of a decrease in volume due to sintering, it is preferable that the pellet contact surface of the cavity 9 have a surface roughness Rz (10 point average roughness) of 3.0 μm or less, and preferably 2.5 μm or less. Thus, the molded body obtained by injection molding is only sintered without grinding, and a sintered magnet having a surface roughness Rz of 2.5 μm or less can thereby be obtained. Therefore, the productivity of the sintered magnet is improved. Further, the surface roughness Rz of the pellet contact surface of the cavity 9 can appropriately be changed depending on the surface roughness Rz of the sintered magnet to be produced.

The lower limit of the surface roughness Rz of the sintered magnet according to the present embodiment is 0.1 μm. Therefore, the lower limit of the surface roughness Rz on the pellet contact surface of the cavity 9 is sufficient to be 0.1 μm. Thereby, time and labor required for finishing the surface of the cavity 9 can be reduced, and thus, a production cost of the mold 8 can be reduced. In addition, in the present embodiment, there is an advantage of a high degree of freedom in the shape of a magnetic powder molded body because the molded body is obtained by injection molding. For this reason, in the method for producing a sintered magnet according to the present embodiment, a sintered magnet having a complex three-dimensional shape can be produced.

After the molded body is obtained by injection molding in step S17, the molded body is subjected to a debinding process (step S18). For example, the debinding process is a process of maintaining the obtained molded body in air at a predetermined temperature (for example, about 300° C. to 600° C.) for a predetermined time (for example, about 1 hour to 60 hours). For example, the molded body after the debinding process is sintered in air (step S19) to obtain a sintered body. The sintering temperature of the molded body is, for example, 1100° C. to 1250° C., and preferably 1160° C. to 1220° C. The sintering time is, for example, about 0.2 hours to 3 hours.

If needed, the obtained sintered body is subjected to deburring, processing, or grinding to complete a ferrite sintered magnet (step S20). The ferrite sintered magnet is then magnetized. In the present embodiment, since a molded body before sintering is produced by injection molding, in principle, the molded body is only sintered to complete a ferrite sintered magnet. Thus, since the grinding or processing of the sintered body can be omitted, the productivity is improved. Further, when the molded body before sintering is produced by injection molding, a complex processing is unnecessary even in a case of production of the ferrite sintered magnet having a complex three-dimensional shape. Accordingly, the productivity is extremely high. A production yield is also improved because there is little possibility of chipping or cracking of the sintered body during processing.

The molded body is produced using CIM in the above description, but a procedure of producing a molded body by the method for producing a ferrite sintered magnet according to the present embodiment is not limited. For example, a ferrite sintered magnet may be produced as follows. In the fine milling in step S14, a slurry for milling is subjected to wet milling, and the obtained slurry for milling is molded to produce a molded body. The obtained molded body is sintered to obtain a sintered body, and the surface of the sintered body is ground to produce a ferrite sintered magnet having a surface roughness of 3.5 μm or less. Next, a case in which the sintered magnet is a sintered metallic magnet will be described.

[Example 2 of Method for Producing Sintered Magnet]

Figure 5:
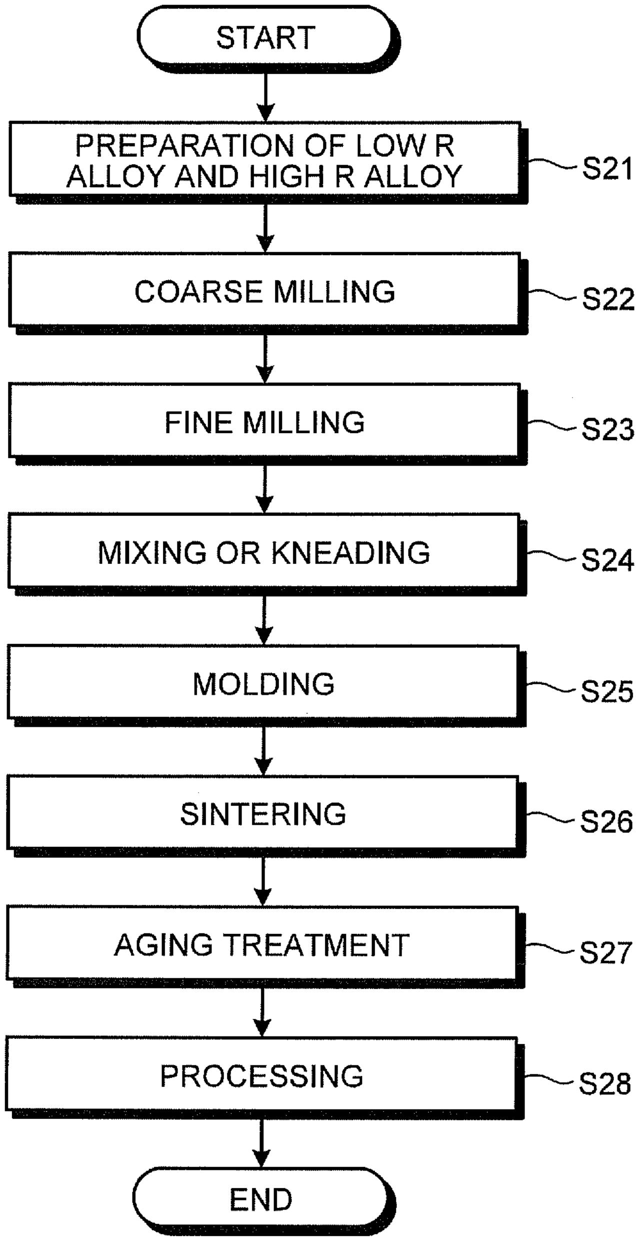
FIG. 5 is a flow chart illustrating a procedure of another method for producing a sintered magnet according to the present embodiment.

FIG. 5 is a flow chart illustrating a procedure of another method for producing a sintered magnet according to the present embodiment. The sintered magnet to be described below is a sintered metallic magnet, and particularly a rare-earth sintered magnet having a composition of R—Fe—B (R is a rare-earth element). The sintered metallic magnet to which the method for producing a sintered magnet according to the present embodiment can be applied is not limited to this type. In the present embodiment, two or more types of alloys are combined so as to obtain a final composition, and then sintered to produce the sintered magnet. In the present embodiment, an alloy (low R alloy) mainly composed of $R_2Fe_{14}B$ crystal grains is combined with an alloy containing a higher amount of R than the low R alloy (high R alloy). However, three or more types of alloys can be combined. Otherwise, the rare-earth sintered magnet can be produced from one type of alloy. When the sintered magnet is produced using the method for producing the sintered magnet according to the present embodiment, the low R alloy and the high R alloy are prepared (step S21).

The low R alloy and the high R alloy are prepared, for example, using a strip casting method. The strip casting method is preferably used because it can improve magnetic characteristics by suppressing the crystal grains from growing in the low R alloy and the high R alloy. The method for preparing the low R alloy and the high R alloy is not limited to this method, but a casting method (such as a centrifugal casting method) can be used. Next, the low R alloy and the high R alloy are coarsely milled (step S22). In the present embodiment, hydrogen milling or mechanical milling (such as disk milling) is used for the coarse milling. However, the method for the coarse milling is not limited to these methods.

In the case of performing the hydrogen milling in the present embodiment, the low R alloy and the high R alloy are held in a hydrogen atmosphere for one hour to five hours at a temperature between about room temperature and 100° C. to allow the low R alloy and the high R alloy to occlude hydrogen and to be milled. Thereafter, the low R alloy and the high R alloy are heated to a temperature of 500° C. to 600° C., and held at that temperature for about one hour to about ten hours so as to be dehydrogenated. After the coarse milling is finished, the coarsely milled powders of the low R alloy and the high R alloy are finely milled (step S23). In the present embodiment, jet milling using an inert gas (such as $N_2$ gas) is used (but not limited thereto) for the fine milling. By the fine milling, low R alloy powder is obtained from the low R alloy, and high R alloy powder is obtained from the high R alloy.

The low R alloy powder and the high R alloy powder after being prepared are mixed at a predetermined ratio (step S24). After the low R alloy powder and the high R alloy powder are mixed, the powder mixture of the low R alloy powder and the high R alloy powder is molded into a predetermined shape to be produced as a molded body (step S25). In the molding of the powder mixture, a predetermined molding pressure is applied to the powder mixture to mold it. In this case, the molding is preferably performed in a magnetic field of an intensity of 800 kA/m or more in order to orient the low R alloy powder and the high R alloy powder. The molding pressure is preferably from about 10 MPa to about 500 MPa.

Thereafter, the molded body thus obtained is sintered (step S26). In the sintering, the molded body obtained in step S25 is sintered in vacuum (reduced pressure atmosphere) for a predetermined time at a predetermined temperature, and thus, a sintered body is obtained. For example, the sintering temperature is set in the range from 1000° C. to 1100° C., and the molded body is sintered for about one hour to about ten hours. A short sintering time increases variability in density and magnetic characteristics of the obtained sintered body while a too long sintering time reduces the productivity of the sintered magnet. Therefore, the sintering time is determined by considering a balance between the variability and the productivity.

After the sintering process is finished, an aging treatment is applied to the sintered body in air, or preferably, in an inert gas atmosphere (step S27). The aging treatment is a treatment of adjusting the magnetic characteristics of the sintered magnet to be obtained by holding the sintered body for a predetermined time at a temperature lower than the sintering temperature and thus by adjusting a structure of the sintered body. The aging treatment is applied under appropriate conditions so as to obtain high magnetic characteristics (such as a coercive force HcJ and a good squareness). The aging treatment can be applied in two stages. In this case, the aging temperature is kept at 700° C. to 900° C. at the first stage, and at 450° C. to 600° C. at the second stage, and the sintered body is held in each of the temperature ranges for one hour to ten hours.

The sintered body after finishing the aging treatment is processed as necessary (step S28). The sintered magnet according to the present embodiment needs to be made to have a surface roughness Rz of 2.5 μm or less before being subjected to a surface treatment. For this reason, the sintered body after finishing the aging treatment and necessary processing is ground on surfaces thereof as necessary so as to have the surface roughness Rz of 2.5 μm or less, and thus is made to be a sintered magnet. This sintered magnet has the surface roughness Rz of 2.5 μm or less, and thus is ensured to have a sufficient strength even if it is thin-walled. A surface treatment (such as plating or resin coating) for suppression of corrosion is applied to the sintered magnet having the surface roughness Rz of 2.5 μm or less. The sintered magnet is then magnetized.

In the molding process (step S25), the molded body may be obtained by injection molding. In this case, the molded body is produced in the following manner. First, the low R alloy powder and the high R alloy powder prepared by the procedure up to step S24 are mixed at a predetermined ratio to obtain magnetic powder. The obtained magnetic powder is mixed with a binder resin, a wax, a lubricant, and a plasticizer, and then kneaded with a kneader for a predetermined time (about two hours) at a temperature of about 150° C. to obtain a kneaded mixture. This kneading is the same as the kneading performed in step S16 described above. The obtained kneaded mixture is molded with a pelletizer (such as a twin taper single extruder). Thus, pellets (magnetic powder mixture) in which the magnetic powder is dispersed in the binder resin are obtained. The obtained pellets are injection-molded to obtain a magnetic powder molded body. The injection molding is the same as that performed in step S17 described above.

As described above, by setting the surface roughness Rz to 2.5 μm or less, the sintered magnet according to the present embodiment can be ensured to have a sufficient strength even if it is thin-walled. In the method for producing a sintered magnet according to the present embodiment, the magnetic powder mixture that is a mixture of the magnetic powder and the binder resin is injection-molded into the mold, and the mold has a surface roughness of 3.0 μm or less on the surface thereof in contact with the magnetic powder mixture. The sintered magnet having the surface roughness Rz of 2.5 μm or less can easily be produced by sintering a molded body obtained from such a mold.

In the case of production of the ferrite sintered magnet among types of sintered magnet, Si and the like are sometimes added as an auxiliary agent in the middle of the process. However, after sintering, most of these elements gather at crystal grain boundaries of the sintered magnet, and hardly appear on the surface. The rare-earth sintered magnet is subjected to the aging treatment after the sintering. However, the temperature of the aging treatment is lower than a temperature required for forming a heterogeneous phase in a glass state containing Si and the like. In addition, the ferrite sintered magnet is not generally subjected to a heat treatment after the sintering. Therefore, in the sintered magnet, the surface roughness Rz cannot be reduced by making the heterogeneous phase appear on the surface of the sintered magnet.

Accordingly, in order to ensure the strength of the thin-walled sintered magnet, it is necessary to reduce the surface roughness Rz of the sintered magnet itself without making the heterogeneous phase appear on the surface thereof.

In injection molding, the surface roughness Rz of the pellet contact surface of a cavity of a mold can be adjusted, so that a molded body having a small surface roughness Rz can be easily mass-produced. Therefore, in the injection molding, the produced molded body is only sintered without grinding of the surface of the obtained ferrite sintered magnet, so that the ferrite sintered magnet having a small surface roughness Rz can be easily mass-produced. Thus, the injection molding is suitable for producing the thin-walled and high-strength sintered magnets in a high volume and in an easy manner.

[Evaluation]

Sintered magnets having different surface roughness Rz values were produced, and strength values thereof were evaluated. The produced sintered magnets were ferrite sintered magnets, and were produced by injection molding. Comparative examples described below do not mean conventional examples. The method for producing the sintered magnet will be described first. $Fe_2O_3$ powder, $SrCO_3$ powder, $La(OH)_3$ powder, $CaCO_3$ powder, and $Co_3O_4$ powder were prepared as starting materials. Predetermined amounts of these materials were weighed, and milled together with an additive using a wet attritor. Then, the milled materials were dried and sized. Thereafter, the dried and sized materials were calcined in air for three hours at 1230° C. to obtain a granular calcined body.

The obtained calcined body was subjected to dry coarse milling with a vibration mill to obtain a calcined powder. Subsequently, sorbitol was used as a dispersant, 0.5 parts by mass of sorbitol, 0.6 parts by mass of $SiO_2$, and 1.4 parts by mass of $CaCO_3$ were added to 100 parts by mass of calcined powder, and the mixture was mixed with water to produce a slurry for milling. The slurry for milling was subjected to wet milling with a ball mill. The wet milling time was 40 hours. After the wet milling, the slurry for milling was dried at 100° C. for 10 hours to obtain a magnetic powder. The average particle diameter of the obtained magnetic powder was 0.3 μm.

The obtained magnetic powder, a binder resin (polyacetal), a wax (paraffin wax), a lubricant (fatty acid ester), and a plasticizer (phthalate ester) were mixed and kneaded with a kneader at 150° C. for 2 hours to obtain a kneaded mixture. At this time, 7.5 parts by mass of the binder resin, 7.5 parts by mass of the wax, and 0.5 parts by mass of the lubricant were mixed with 100 parts by mass of magnetic powder. Further, 1 part by mass of the plasticizer was mixed with 100 parts by mass of the binder resin. The obtained kneaded mixture was molded with a pelletizer to produce pellets (magnetic powder mixture) in which the magnetic powder was dispersed in the binder resin.

Then, the obtained pellets were injection molded to produce a molded body. The molded body had a circular (C-shaped) cross-section. The mold having a cavity with such a shape was used. The obtained pellets were input through an input port of an injection molding apparatus, and then introduced into an extruder heated at 160° C. The pellets were heated and molten inside the extruder of the injection molding apparatus and injected by a screw into the cavity of the mold with a magnetic field applied. Thus, a C-shaped molded body was obtained.

The molded bodies were subjected to a debinding process of maintaining the molded bodies in air for 48 hours at 500° C. The molded bodies subjected to the debinding process were sintered in air for one hour at 1200° C. As a result, ferrite sintered magnets having a composition of $La_{0.4}Ca_{0.2}Sr_{0.4}Co_{0.3}Fe_{11.3}O_{19}$ were obtained. The obtained ferrite sintered magnets were ground so as to have thicknesses of 1 mm, 1.5 mm, 2 mm, 2.5 mm and 3 mm. In the grinding process, the sintered magnet samples having the respective thicknesses were obtained by changing the grain size of a grindstone. In this evaluation, a total of 45 samples including examples 1 to 35 and comparative examples 1 to 10 were produced and evaluated. The thickness of each of the samples was measured in the position of center of gravity thereof. In this evaluation, each of the samples has a uniform thickness, and therefore, has the same size not only in the position of center of gravity but in all positions of the sample. The strength and the surface roughness Rz of each of the obtained samples were measured.

Figures 1, 6:
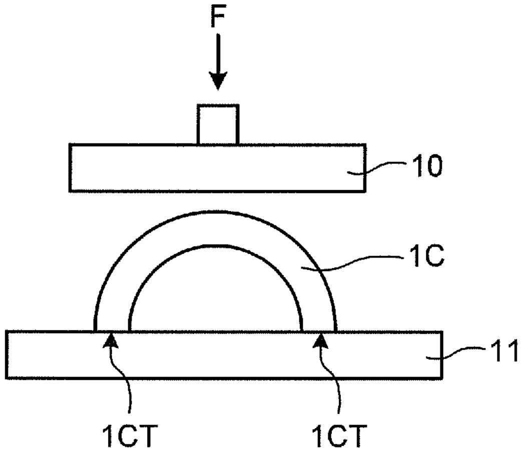
Figures 2, 6:
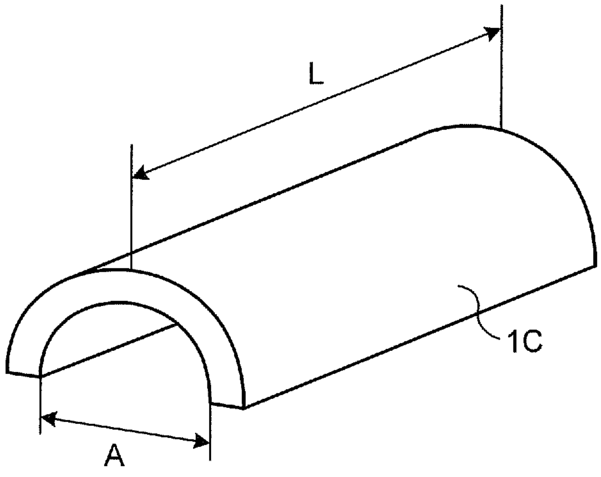
Figures 3, 6:
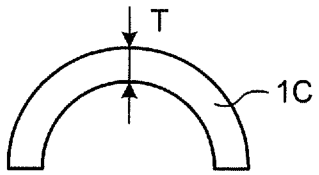

FIG. 6-1 is an explanatory view illustrating a method for measuring the strength. FIGS. 6-2 and 6-3 are explanatory views of dimensions of the sample. As illustrated in FIG. 6-1, the strength of a sample was obtained by a bending test. In the bending test, rectangular ends 1 CT of a C-shaped sample 1C are placed on a test stand 11, and a load application body 10 is pressed onto an arc portion of the sample IC to apply a load F to the sample 1 C. Then, the load F when the sample 1C broke was measured. The strength σwas obtained from equation (1).

$$\sigma[N/\mathrm{mm}^2]=3\times L\times F/(2\times A\times T^2) \quad (1)$$

As illustrated in FIG. 6-2, L is a sample length [mm], and A is a distance [mm]between the rectangular ends 1 CT. As illustrated in FIG. 6-3, T is a sample thickness [mm]. F is the load [N]. In this evaluation, L is 9.0 mm, A is 7.1 mm, and the values of T are 1.0 mm, 1.5 mm, 2.0 mm, 2.5 mm, and 3.0 mm.

The surface roughness Rz of the surface of the obtained sample 10 was measured. The surface roughness Rz was measured using a stylus type surface roughness tester for measuring the height of surface irregularity. In that measurement, the reference length was 0.7 mm, the cutoff value was 0.8 mm, and the scanning rate of a stylus was 0.3 mm/sec. Table 1 lists the results of measurement of the thickness, the strength σ, and the surface roughness Rz of each of the samples.

TABLE 1

| | Thickness (mm) | Rz (μm) | Strength ($N/mm^2$) | Per-thickness Strength ($N/mm^3$) | Determination |
|---|---|---|---|---|---|
| Example 1 | 3 | 0.09 | 185 | 61.7 | (○) |
| Example 2 | 3 | 0.78 | 185 | 61.7 | (○) |
| Example 3 | 3 | 1.26 | 173 | 57.7 | (○) |
| Example 4 | 3 | 1.61 | 160 | 53.3 | (○) |
| Example 5 | 3 | 1.82 | 140 | 46.7 | (○) |
| Example 6 | 3 | 1.99 | 120 | 40.0 | (○) |
| Example 7 | 3 | 2.45 | 86 | 28.7 | ○ |
| Comparative Example 1 | 3 | 3.11 | 48 | 16.0 | X |
| Comparative Example 2 | 3 | 4.01 | 40 | 13.3 | X |
| Example 22 | 2.5 | 0.08 | 176 | 70.5 | (○) |
| Example 23 | 2.5 | 0.80 | 176 | 70.4 | (○) |
| Example 24 | 2.5 | 1.26 | 165 | 66.0 | (○) |
| Example 25 | 2.5 | 1.60 | 155 | 62.0 | (○) |
| Example 26 | 2.5 | 1.83 | 135 | 54.0 | (○) |
| Example 27 | 2.5 | 2.00 | 115 | 46.0 | (○) |
| Example 28 | 2.5 | 2.44 | 80 | 32.0 | ○ |
| Comparative Example 7 | 2.5 | 3.09 | 48 | 19.3 | X |
| Comparative Example 8 | 2.5 | 4.02 | 38 | 15.0 | X |
| Example 8 | 2 | 0.08 | 175 | 87.5 | (○) |

TABLE 1-continued

| | Thickness (mm) | Rz (μm) | Strength (N/mm²) | Per-thickness Strength (N/mm³) | Determination |
|---|---|---|---|---|---|
| Example 9 | 2 | 0.80 | 175 | 87.5 | (O) |
| Example 10 | 2 | 1.26 | 163 | 81.5 | (O) |
| Example 11 | 2 | 1.60 | 155 | 77.5 | (O) |
| Example 12 | 2 | 1.83 | 130 | 65.0 | (O) |
| Example 13 | 2 | 2.00 | 110 | 55.0 | (O) |
| Example 14 | 2 | 2.44 | 76 | 38.0 | O |
| Comparative Example 3 | 2 | 3.09 | 46 | 23.0 | X |
| Comparative Example 4 | 2 | 4.02 | 38 | 19.0 | X |
| Example 29 | 1.5 | 0.08 | 171 | 113.7 | (O) |
| Example 30 | 1.5 | 0.78 | 171 | 113.7 | (O) |
| Example 31 | 1.5 | 1.26 | 161 | 107.5 | (O) |
| Example 32 | 1.5 | 1.60 | 155 | 103.2 | (O) |
| Example 33 | 1.5 | 1.83 | 129 | 86.0 | (O) |
| Example 34 | 1.5 | 2.00 | 107 | 71.2 | (O) |
| Example 35 | 1.5 | 2.44 | 71 | 47.0 | O |
| Comparative Example 9 | 1.5 | 3.09 | 42 | 28.0 | X |
| Comparative Example 10 | 1.5 | 4.02 | 36 | 24.0 | X |
| Example 15 | 1 | 0.09 | 165 | 165.0 | (O) |
| Example 16 | 1 | 0.76 | 165 | 165.0 | (O) |
| Example 17 | 1 | 1.28 | 153 | 153.0 | (O) |
| Example 18 | 1 | 1.60 | 151 | 151.0 | (O) |
| Example 19 | 1 | 1.81 | 120 | 120.0 | (O) |
| Example 20 | 1 | 2.02 | 100 | 100.0 | (O) |
| Example 21 | 1 | 2.44 | 66 | 66.0 | O |
| Comparative Example 5 | 1 | 3.15 | 40 | 40.0 | X |
| Comparative Example 6 | 1 | 4.03 | 30 | 30.0 | X |

Figure 7:
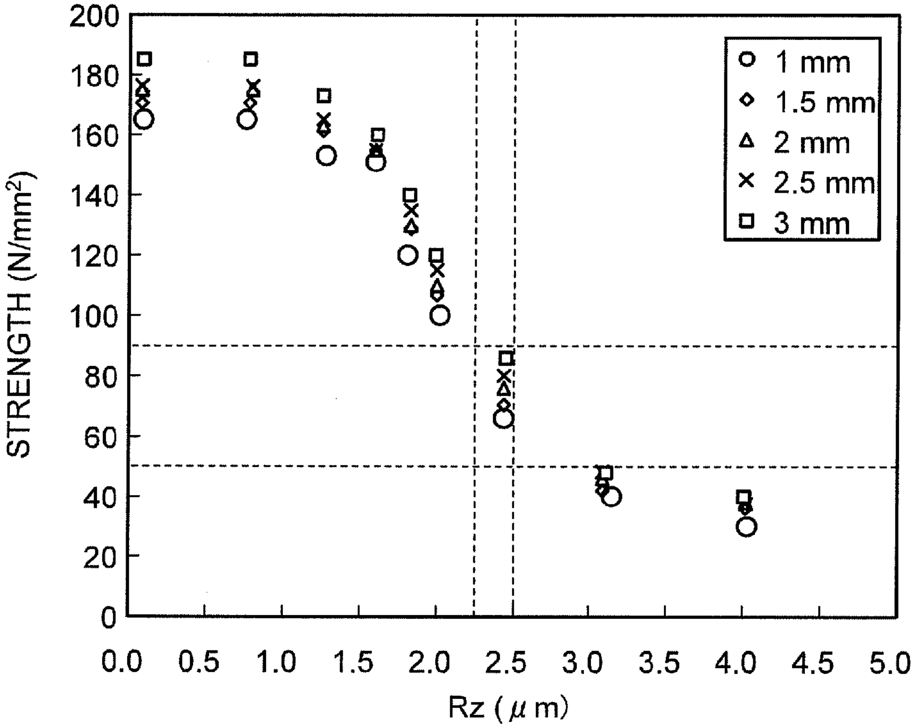
FIG. 7 is a diagram illustrating relationships between strength values and surface roughness values Rz listed in Table 1.

FIG. 7 is a diagram illustrating relationships between strength values and surface roughness values Rz listed in Table 1. In FIG. 7, a white square represents a result of the sample having a thickness of 3 mm; a cross "X" represents a result of the sample having a thickness of 2.5 mm; a white triangle represents a result of the sample having a thickness of 2 mm; a white rhombus "◇" represents a result of the sample having a thickness of 1.5 mm; and a white circle represents a result of the sample having a thickness of 1 mm. In this evaluation, "X" is given if the strength σ is less than 50 $N/mm^2$; "O" is given if the strength σ is 50 $N/mm^2$ or more; and "(O)" is given if the strength σ is 90 $N/mm^2$ or more. The reference value of the evaluation is satisfied when the strength σ of a sample is 50 $N/mm^2$ or more. It is found from the results of Table 1 and FIG. 7 that the strength σ of a sample increases as the surface roughness Rz of the sample is reduced. The behavior of the strength σ of samples exhibits the same tendency as that described above, regardless of thickness of the sample. It is found that, when the surface roughness Rz of a sample is 2.5 μm or less, the strength is 50 $N/mm^2$ or more, and thus, the reference value is satisfied. It is also found that, when the surface roughness Rz of a sample is reduced to 2.5 μm or less, the strength σ significantly increases compared with the case in which the surface roughness Rz of a sample is more than 2.5 μm.

Based on the results of FIG. 7, in the ferrite sintered magnet having any thickness, the strength σ exceeds 90 $N/mm^2$ giving the evaluation of (O) when the surface roughness Rz is 2.25 μm or less. Therefore, the surface roughness Rz is preferably 2.25 μm or less, and more preferably 1.8 μm or less. Further, in the ferrite sintered magnet having any thickness, the rate of increase of the strength σ by reducing the surface roughness Rz becomes smaller when the surface roughness Rz is reduced to 1.6 μm. In other words, it can be said that a change curve of the strength σ with respect to the surface roughness Rz has an inflection point at the surface roughness Rz of 1.6 μm. That is, when comparing the case of the surface roughness Rz being more than 1.6 μm with the case of that being 1.6 μm or less, it can be said the strength σ is significantly higher in the case of the surface roughness Rz being 1.6 μm or less. Therefore, the surface roughness Rz is further preferably 1.6 μm or less.

In the above-described results of FIG. 2, the ferrite sintered magnet having a thickness of 5 mm and a surface roughness Rz of 3.0 μm has a strength σof 104 $N/mm^2$. Also, the ferrite sintered magnet having a thickness of 4 mm and a surface roughness Rz of 3.0 μm has a strength a of 62 $N/mm^2$. As seen from the values of the strength σand the surface roughness Rz for the examples 1 to 35, when the surface roughness Rz is 2.0 μm or less, a strength σequal to or more than that of a ferrite sintered magnet having a thickness of 5 mm and a surface roughness Rz of 3.0 μm is obtained. Also, when the surface roughness Rz is 2.5 μm or less, a strength σequal to or more than that of a ferrite sintered magnet having a thickness of 5 mm and a surface roughness Rz of 3.0 μm is obtained. Thus, it can be said that, even when the ferrite sintered magnet is thinned to have a thickness of 3 mm or less, a strength equal to or more than that of a thicker ferrite sintered magnet can be ensured by reducing the surface roughness Rz to 2.5 μm or less.

After the surface roughness Rz of a sample is reduced to less than 1.0 μm, the strength σ of the sample has an almost constant value even when the surface roughness Rz is reduced to 0.1 μm. Therefore, it can be determined that, in practice, the lower limit of the surface roughness Rz is sufficient to be 1.0 μm without the need for excessively reducing the surface roughness Rz. There are conceivable cases where a sufficient strength σ can be ensured when the lower limit of the surface roughness Rz is 0.5 μm or more, or 1.0 μm or more depending on use conditions and the thickness of the sintered magnet. Consequently, the productivity can be improved while avoiding excessive processing (grinding) of the sintered magnet.

Figure 8:
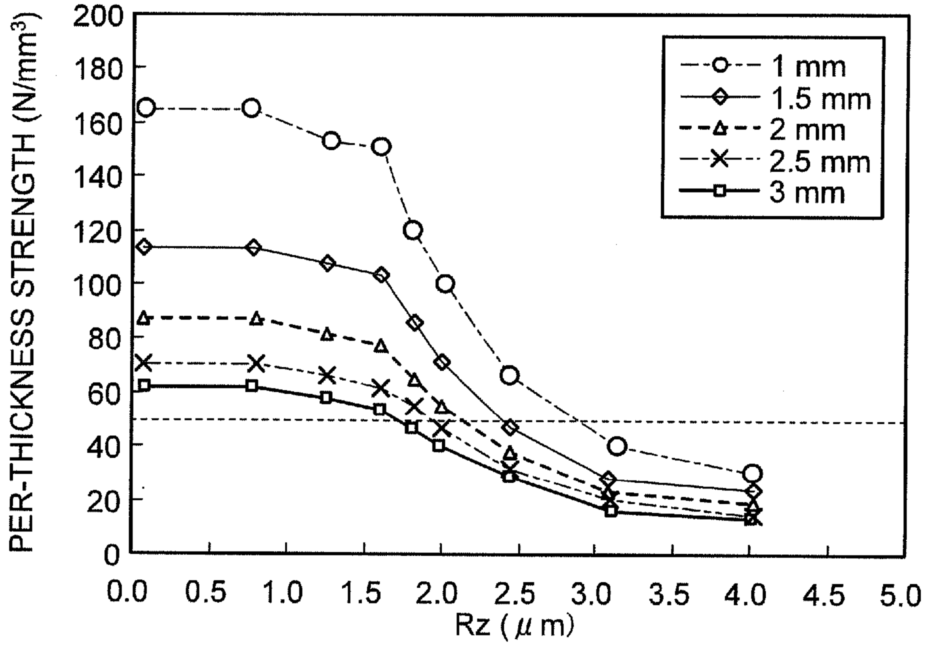
FIG. 8 is a diagram illustrating relationships between values of strength per unit thickness of a sintered magnet and the surface roughness values Rz, the values of strength per unit thickness being converted from the strength values listed in Table 1.

FIG. 8 is a diagram illustrating relationships between values of strength per unit thickness of the sintered magnet and the surface roughness values Rz, the values of strength per unit thickness being converted from the strength values listed in Table 1. In FIG. 8, a white square represents a result of the sample having a thickness of 3 mm; a cross "X" represents a result of the sample having a thickness of 2.5 ; a white triangle represents a result of the sample having a thickness of 2 mm; a white rhombus "◇" represents a result of the sample having a thickness of 2.5 mm; and a white circle represents a result of the sample having a thickness of 1 mm. A per-thickness strength indicated on the vertical axis of FIG. 8 is a value converted from the strength σof the sample into a strength per unit thickness of the sintered magnet, that is, a value obtained by dividing the strength σof the sample by the thickness of the sample, and is expressed in units of $N/mm^3$.

It is found from FIG. 8 that the per-thickness strength increases as the surface roughness Rz of the sample decreases. In addition, the per-thickness strength increases with respect to the decrease of the surface roughness Rz more rapidly as the thickness of the sample decreases. Moreover, the per-thickness strength increases as the thickness of the sample decreases. When the thickness of the sample is 1 mm, the per-thickness strength is twice as high as that when the thickness of the sample is 2 mm. Thus, a sintered magnet having a smaller thickness has a more remarkable effect of increasing strength by reducing the surface roughness Rz of the sintered magnet. Accordingly, it can be said that the sintered magnet according to the present embodiment can exhibit a more effect of improving the strength σ as the thickness of the sintered magnet is smaller.

It is found from the results of FIG. 8 that whether the per-thickness strength exceeds a predetermined per-thickness strength (50 $N/mm^3$ in the present embodiment) depends on the thickness and the surface roughness Rz, and that they each have a desirable range. The range of the surface roughness Rz in which the predetermined per-thickness strength is exceeded tends to increase as the thickness of the sample decreases. The desirable ranges of the thickness and the surface roughness Rz in which the predetermined per-thickness strength is exceeded will be given below. The predetermined per-thickness strength can be ensured by setting the surface roughness Rz within the following ranges for the respective ranges of the thickness.

(1) When the thickness is more than 2.5 mm and not more than 3.5 mm, Rz is 0.1 μm or more and not more than 1.6 μm.

(2) When the thickness is more than 2.0 mm and not more than 2.5 mm, Rz is 0.1 μm or more and not more than 1.9 μm.

(3) When the thickness is more than 1.5 mm and not more than 2.0 mm, Rz is 0.1 μm or more and not more than 2.2 μm.

(4) When the thickness is more than 1.0 mm and not more than 1.5 mm, Rz is 0.1 μm or more and not more than 2.4 μm.

(5) When the thickness is 1.0 mm or less, Rz is 0.1 μm or more and not more than 2.75 μm (preferably not more than 2.5 μm).

INDUSTRIAL APPLICABILITY

As described above, the sintered magnet and the method for producing the sintered magnet according to the present invention are useful for ensuring the strength of the thin-walled sintered magnet, and are particularly suitable for the ferrite sintered magnet.

REFERENCE SIGNS LIST

1, 1*a*, 1*b* Sintered magnet
10 Sample
1CT Rectangular ends
2 Injection molding apparatus
3 Magnetic field application apparatus
4 Input port
5 Screw
6 Extruder
6C Casing
6H Injection port
7 Pellets
8 Mold
9 Cavity
10 Load application body
11 Test stand

The invention claimed is:

1. A sintered magnet made by sintering a magnetic material, the sintered magnet having a thickness of 3.5 mm or less in the position of center of gravity thereof and a surface roughness Rz of 2.5 μm or less, And the sintered magnet is a hard ferrite sintered magnet.

2. The sintered magnet according to claim 1, wherein the surface roughness Rz is 0.1 μm or more.

* * * * *